United States Patent [19]

Gillern et al.

[11] 4,264,671

[45] Apr. 28, 1981

[54] PHENOL FORMALDEHYDE RESOLES AND LAMINATES

[75] Inventors: M. Frank Gillern; Katashi Oita, both of Seattle; Robert J. Teng, Federal Way; George T. Tiedeman, Seattle, all of Wash.

[73] Assignee: Weyerhaeuser Company, Tacoma, Wash.

[21] Appl. No.: 930,262

[22] Filed: Aug. 2, 1978

[51] Int. Cl.$^3$ .................................................. B32B 5/06
[52] U.S. Cl. ................................. 428/302; 156/312; 156/335; 260/29.3; 427/389.8; 427/393.3; 428/251; 428/273; 428/436; 428/921; 528/140; 528/147
[58] Field of Search ............................... 156/312, 335; 427/390 A, 390 D; 428/251, 436, 273, 921, 302; 528/140, 147; 260/29.3

[56] References Cited

U.S. PATENT DOCUMENTS

| | | | |
|---|---|---|---|
| 1,909,786 | 5/1933 | Pantke | 260/33.4 R |
| 1,909,788 | 5/1933 | Pantke | 260/33.4 R |
| 2,683,105 | 7/1954 | Forbes et al. | 156/312 |
| 3,226,364 | 12/1965 | O'Connell | 528/147 |
| 3,620,902 | 11/1971 | Anderson et al. | 156/335 |
| 3,634,317 | 1/1972 | Klemke | 260/45.7 P |
| 4,017,437 | 4/1977 | Vasishth et al. | 156/335 |
| 4,122,144 | 10/1978 | Vasishth et al. | 156/335 |

FOREIGN PATENT DOCUMENTS

| | | | |
|---|---|---|---|
| 20977 | of 1915 | United Kingdom | 528/147 |
| 292629 | 6/1928 | United Kingdom | 528/140 |
| 806273 | 12/1958 | United Kingdom | 528/147 |

OTHER PUBLICATIONS

Vanshey et al., "Production of Colorless Resins From Phenol and Formaldehyde", STS Translation (Order #16932).

*Primary Examiner*—John J. Gallagher
*Attorney, Agent, or Firm*—Weyerhaeuser Company

[57] ABSTRACT

Low-color or white, dilutable condensation products of formaldehyde and phenol in molar ratios of 1.9–5.0:1, characterized by carbon-13 nuclear magnetic resonance spectra as having at least about 30 molar percent of the total formaldehyde content of the resin bound to phenol nuclei in benzyl formal groups of the form Ph—(CH$_2$O)$_n$—CH$_2$OH wherein n≧1, and less than about 40 molar percent of the total formaldehyde content of the resin bound to phenol nuclei in methylol groups of the form Ph—CH$_2$OH, wherein Ph is a phenol nucleus. Phenol, water and an alkaline catalyst, limited to 0.5–2.2 moles of catalyst per 100 moles of phenol and preferably lithium carbonate, are mixed with formaldehyde at 1.9–5.0 formaldehyde to phenol ratios. The reaction mixture is heated at a uniform rate over 1 hour to reflux temperature and refluxed until a viscosity of 400–500 centipoise at 50–75% solids is attained. The mixture is cooled to 50° C. and neutralized with acid to a pH of 3–7, preferably with citric acid. The resulting resin may be employed, without solvent dilution, to make resin-fiberglass laminates that have strengths comparable to polyester or epoxy laminates. The laminates have exceptional fire resistance and low smoke evolution when exposed to flame.

14 Claims, 3 Drawing Figures

Fig. 2

PHENOL FORMALDEHYDE RESOLES AND LAMINATES

FIELD OF THE INVENTION

The field of this invention is phenol-formaldehyde resoles. More particularly, the resoles of interest are useful in making fire-resistant resin-glass laminated products.

DESCRIPTION OF THE PRIOR ART

Important laminated products are made by impregnating glass fiber cloth with polyesters or epoxy polymers, followed by curing to a stable state by heating under pressure. The finished laminates are known for their excellent mechanical strengths because the resins bond extremely well to the glass fibers. However, both polyesters and epoxies have little resistance to fire. Both materials burn, producing heavy smoke.

It has long been recognized that acidic and mildly alkaline phenol-formaldehyde resins are among the most fire resistant of the common polymers. They do not burn readily and are self-extinguishing. Also, they produce little smoke or "punking" after exposure to flame. What fumes are generated are of lower toxicity than those produced by most materials commonly in use today.

Several disadvantages of phenol-formaldehyde resins have, however, prevented development of a laminate having the necessary commercial qualities. For example, it is important in laminate production that the resin remain in a certain viscosity range for the period of time necessary to incorporate it into the substrate. But it has been difficult to design uncured phenol-formaldehyde P/F resins that readily flow and penetrate the substrate material, yet are retained in the laminate during pressing. Adjusting viscosity is difficult because a typical resole cures very rapidly to an unworkable viscosity within a narrow temperature range.

Viscosity control has often been approached practically by diluting the resin with organic solvents, since the resoles are not generally water soluble. The solvents, such as the various lower alkyl alcohols, present potential safety and fire hazards to workers. Cost is also increased.

Another competitive disadvantage of P/F resin laminates has been their intense color. Cured products are generally a dark brown to black. Therefore, a coating must be applied if a light color finished product is desired.

The stability or storage life of the resole intermediate, while awaiting use in the laminating process, has also caused difficulty in the past. P/F resins tend to advance rapidly and change viscosity if not refrigerated.

It is an object of the present invention to describe a phenol-formaldehyde resole that has a balance of functional groups, in terms of how the formaldehyde is bound to phenolic nuclei, that results in resin intermediate characteristics particularly suitable for making laminates. Thus, major advantages of the phenol-formaldehyde resins of this invention are that they may be easily processed into finished resin-glass laminates and have superior fire resistance and lower smoke-generating properties than prior-art phenol-formaldehyde resins.

An object of the invention is to provide a resin that is water dilutable, prior to curing. The resin also readily wets out laminate substrate materials without the use of difficult-to-handle organic solvents.

It is a further object of this invention to provide a P/F resin that can be cured in a single heating step to full mechanical strengths.

The structure of the resin of this invention may be adjusted by varying resin cooking conditions to provide curing characteristics that are compatible with existing equipment and processing conditions designed for making polyester or epoxy laminated panels.

The resin products of the invention range in color from white to beige, depending upon cure temperature.

The resin of this invention also has an extended storage life. That is, it does not significantly change in viscosity or advancement for six months or longer at room temperature. The resin remains usable over time without the necessity of making process changes in manufacturing due to deterioration.

Most phenol-formaldehyde reaction products contain, in large proportions, formaldehyde attached to phenol rings as methylol groups ($-CH_2OH$) and methylene bridges ($-CH_2-$). When mildly heated, the methylol groups readily condense with each other to form ethers or displace reactive protons on the phenolic rings. Where a heat-curing resin is desired, the initial reaction between phenol and formaldehyde is catalyzed with a base, which is known to produce a predominance of methylols. These resins are called resoles and their degree of condensation or molecular weight is often referred to as A, B or C-stage. The initial addition of formaldehyde to the phenol ring and partial condensation produces an A-stage resin. Continued heating causes the resin to increase in molecular weight, primarily by chain lengthening. The resin decreases in water solubility, becoming more viscous and rubbery, although retaining thermoplastic characteristics. This is a B-stage resin. Continued heating results in a cured, three-dimensionally cross-linked, insoluble and infusible solid, commonly termed a C-stage resin. Whiteside, *Phenolic Resins* 32 (2d Edition 1967).

The prior art has long recognized that the structural arrangement or distribution of formaldehyde in a P/F resin is the principal source of its characteristic properties.

Raw material ratios, catalysts and processing conditions have been varied in the past in attempts to produce resins having certain formaldehyde distributions in the hope of achieving desired characteristics. The tailoring process, however, has been hampered because resins were extremely difficult to analyze structurally. As a result, the chemist-inventor has usually had only an incomplete understanding of the structural results produced by a particular set of processing conditions.

There are now tools permitting detailed analysis of the phenol-formaldehyde structure. Proton magnetic resonance spectroscopy (PMR) has in the last 15 years provided insight into the chemical structure of the uncured, solvent-soluble resins. Initially, PMR permitted direct measurement of the relative amounts of methylene bridges at different positions on the phenolic ring. Further work by Woodbury, et al, entitled "Proton Magnetic Resonance Study of the Structure of Phenol-Formaldehyde Resins," 3 *Journal of Polymer Science: Part A*, 1079 (1965) has shown that resoles are structurally a mixture of phenolic nuclei joined by methylene ($-CH_2-$) and ether ($-CH_2-O-CH_2$) bridging, while formal ($-CH_2-OCH_2OH$) and methylol ($-CH_2OH$) groups are attached at various phenolic ring positions. While others have recognized the importance of the ether, methylol and methylene groups, Woodbury was the first to recognize the substantial presence of stable benzyl hemi-formals (Ph—(CH$_2$O)-n—CH$_2$OHn≧1). Woodbury expressed the belief that the presence of the formals must have an important influence on the condensation reaction during prepolymer synthesis and subsequent cure. He suggested that effects and contributions needed to be explored further experimentally.

SUMMARY OF THE INVENTION

The resin of this invention is a water-dilutable, condensation product of formaldehyde and phenol in molar ratios of 1.9–5:1, characterized by carbon-13 nuclear magnetic resonance spectra as having at least about 30 molar percent of the total resin formaldehyde content of the resin bound in benzyl formal groups of the form Ph—(CH$_2$O)$_n$—CH$_2$OH wherein n≧1 and less than about 40 molar percent of the total resin formaldehyde content bound in methylol groups of the form Ph—CH$_2$OH, wherein Ph is a phenol nucleus. The resin cures to a white or low-color, insoluble, infusible solid by heating to about 100°–150° C.

A novel process for making the resin characterized above comprises (a) mixing phenol, water and alkaline catalyst, limited to 0.5–2.2 moles of catalyst per 100 moles of phenol, with formaldehyde in the amount of 1.9–5.0 moles per mole of phenol; (b) heating the mixture to reflux temperature at the uniform rate over about a 1-hour period; (c) refluxing the mixture until a target viscosity of 400–500 centipoise at 50–75% resin solids content is attained; (d) cooling the mixture; and (e) neutralizing the mixture with an acid to a pH range of 3–7. The finished resin intermediate is water dilutable and can be dissolved in a 20% isopropyl alcohol solution in ratios of 0.5 parts resin to one part solution.

The finished resin is particularly suitable for making low-color, highly fire-resistant resin-glass fiber laminated products that have mechanical strengths comparable with epoxy, polyester and polyimide resin glass laminates.

A resin-glass "prepreg" is prepared by saturating a glass fiber web with the resin characterized above. The saturated web is squeezed to a desired resin content and B-staged or advanced by the application of heat at 100°–140° C. for about 2.0 minutes. The finished prepreg contains at least about 30% phenol formaldehyde resin and less than about 1.5% volatile content.

The finished prepreg may be cut to a desired shape and assembled into a precure laminate. The precure laminate is pressed at contact pressure (2–15 psig) and heated to 100°–130° C. for 10–30 minutes. The laminate is then pressed at a higher pressure of 15–200 psig and heating is continued at 100°–140° C. The laminate cures to the insoluble, infusible state having attained maximum mechanical strength.

DETAILED DESCRIPTION OF THE PREFERRED EMBODIMENT

The Resin

In the resin intermediate of this invention the formaldehyde charged to the process is bound to phenolic nuclei as:

(1) addition products:
 (a) benzyl formal groups —Ph—(CH$_2$O)$_n$CH$_2$OH, n≧1;
 (b) methylol groups —Ph—CH$_2$OH; and
(2) condensation products:
 (c) methylene bridged groups —Ph—CH$_2$—Ph, and
 (d) ether bridged groups —Ph—CH$_2$O—CH$_2$—Ph, wherein Ph is a phenol nucleus.

Some of the formaldehyde in the resin product remains in an unreacted state.

The resin intermediate of this invention is characterized by (1) the molar percent of formaldehyde present in the above-indicated functional groups, and (2) a carbon-13 nuclear magnetic resonance spectra. The carbon-13 NMR characterization technique was selected because the more commonly used proton NMR spectroscopy does not provide adequate resolution of functional group peaks and requires troublesome dehydration and acetylation procedures. The lack of quantitation capability of the carbon-13 NMR spectra for drastically different functional groups was circumvented by supplemental use of proton NMR where necessary.

The NMR characterization requires determination of spectra for model compounds of the expected reaction products to establish peak identities for each chemical species. This includes those that differ only with respect to the position on the aromatic ring where the group of interest is bound. The area under the identified peaks is proportional to the amount of the particular substituent and can be determined by integration. These values are then used to establish quantitatively the molar percent of the particular group, based on the total moles of formaldehyde charged to the synthesis process. Molecular weight and free, unbound formaldehyde are also determined from the data generated.

Figure 1:
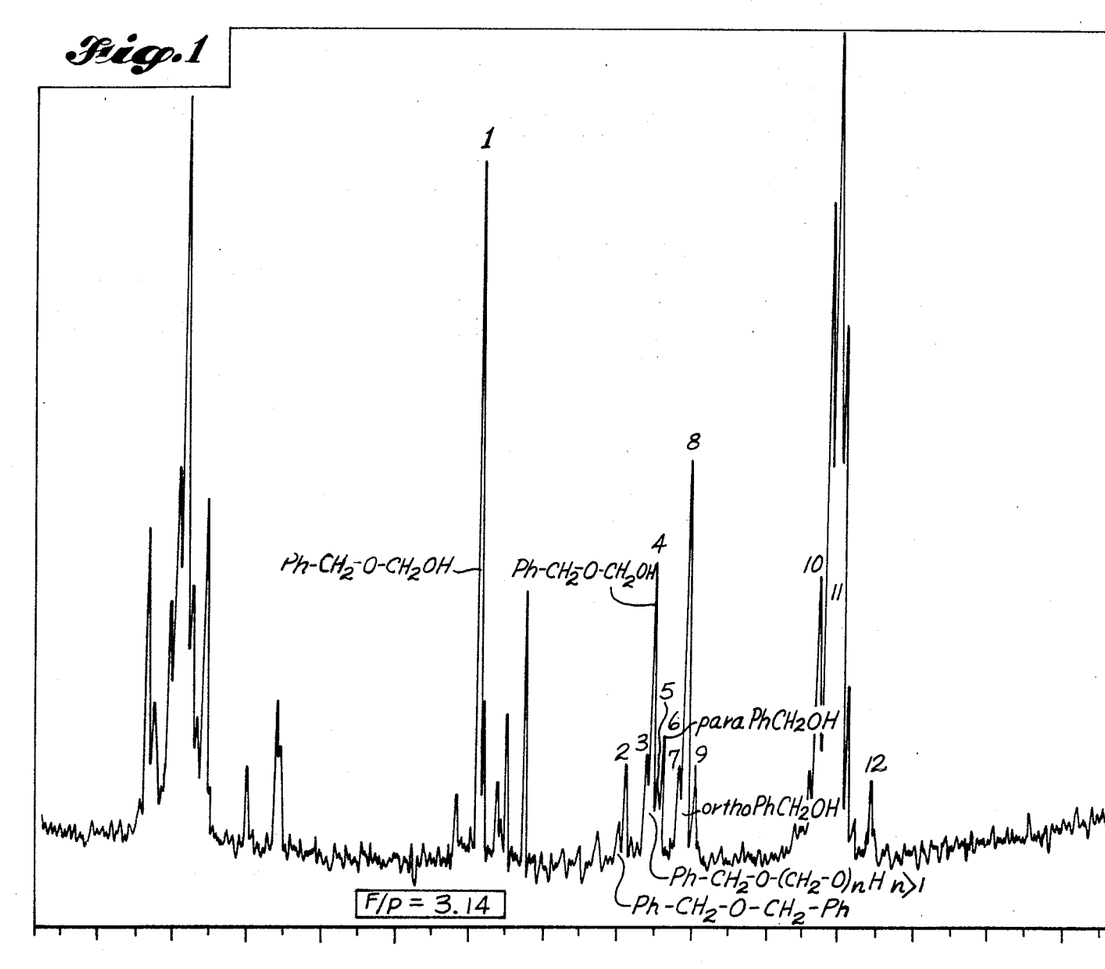
FIG. 1 is a carbon-13 Nuclear Magnetic Resonance ($^{13}$C NMR) spectrum of the resin of this invention at a formaldehyde-phenol ratio (F/P) of 3.14.

Referring to FIG. 1, a carbon-13 NMR spectrum of the resin, made with a formaldehyde to phenol (F/P) molar ratio of 3.14, is shown. The peaks showing the benzyl formal and methylol functional group structures are labeled with the appropriate chemical structure, wherein Ph is a phenol nucleus.

Peaks 1 and 3–5 are benzyl formal groups. The formal group has been found to be fairly stable, at least below 160° C., and thus contributes substantially to the uncured resin's unique physical handling or processability proportions. Peaks 1, 4 and 5 are identified as monoformals of the structure Ph—CH$_2$O—CH$_2$OH. Peak 3 has been tentatively identified as a low concentration of benzyl polyformals of the type Ph—CH$_2$—O—(CH$_2$—O)$_n$H, wherein n>1.

Peak 2 is identified as formaldehyde content of the resin distributed in benzyl ether groups of the structure Ph—CH$_2$—O—CH$_2$—Ph.

Methylol groups, which are also important in determining the desirable characteristics of the resin intermediate, are identified as peaks 6, 7, 8 and 9 in FIG. 1. Peak 6 is para-methylol and peaks 7–9 are orthomethylol groups. These end groups correspond to the structure Ph—CH$_2$OH.

Peaks 10 and 12 are identified as methylene bridged phenolic nuclei of the type Ph—CH$_2$—Ph.

The large peak 11 is the dimethylsulfoxide solvent used to dissolve the sample in the NMR study.

Figure 2:
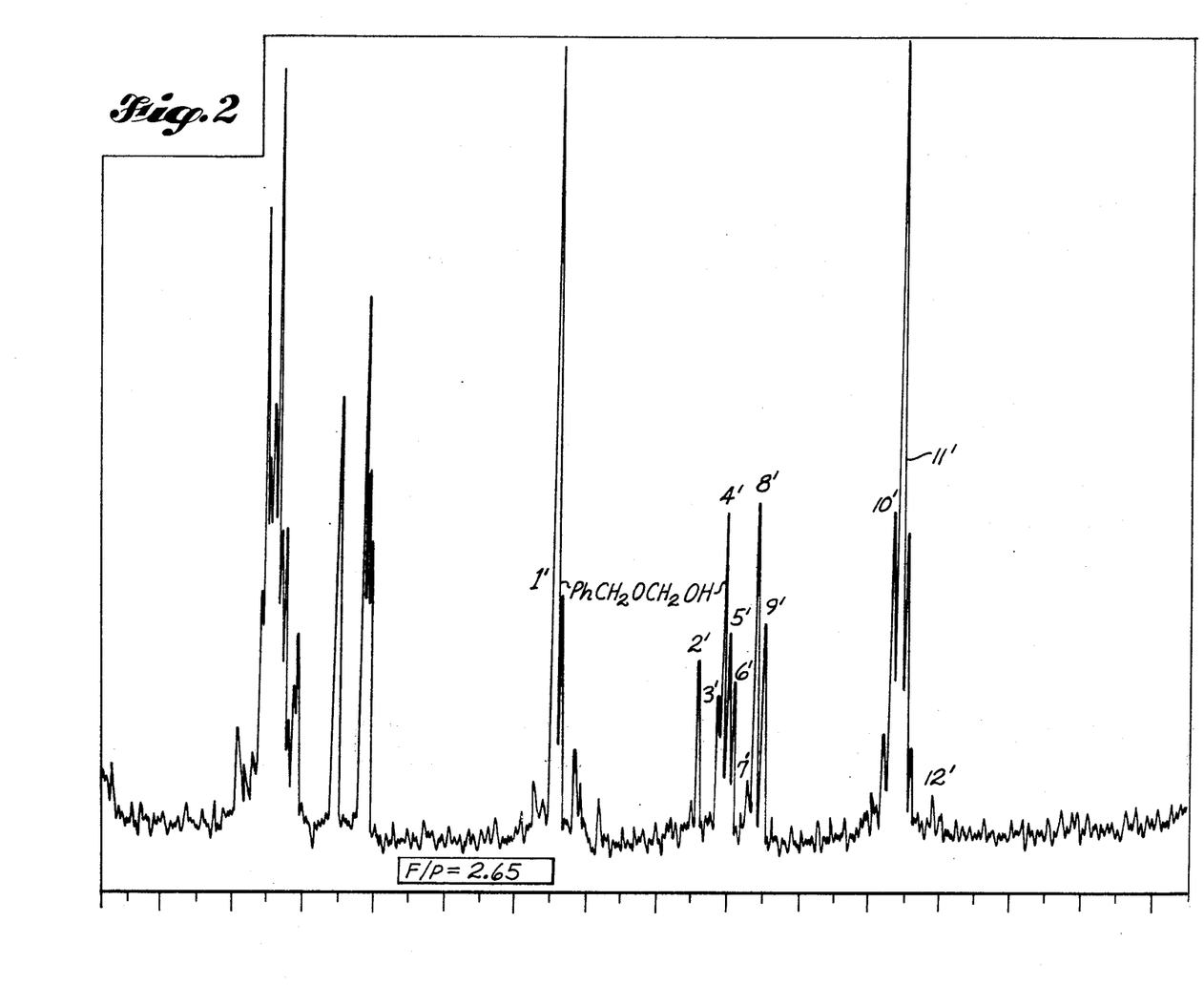
FIG. 2 is a $^{13}$C NMR spectrum of the resin at an F/P of 2.65.
Figure 3:
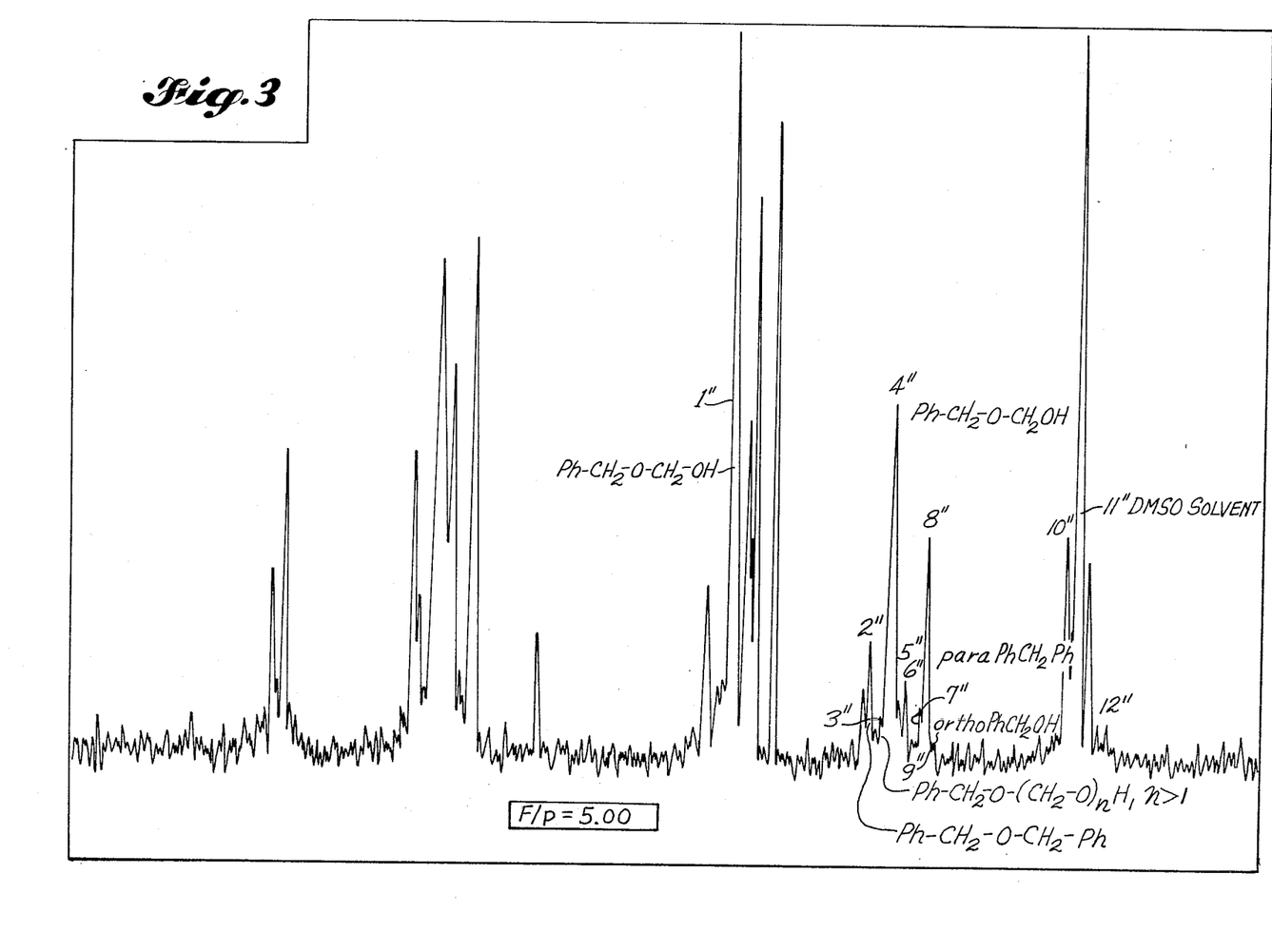
FIG. 3 shows a $^{13}$C NMR spectrum of a resin of the invention at an F/P of 5.

FIGS. 2 and 3 show carbon-13 NMR spectra for other resoles of the invention wherein the F/P ratio charged to the synthesis reaction is 2.65 and 5.00, respectively. The spectra peaks, labeled with the (') or (") are defined as in FIG. 1. The spectra differ only quantitatively, as will be shown below in the examples.

With the peaks of the NMR spectra properly identified, the quantitative amounts of the various functional groups are calculated by integrating the areas under the curve trace. The proton NMR spectra were used to determine methylenes and quantitatively relate the methylene group and one of the oxymethylene species. The carbon-13 spectra were used to determined oxymethylene species.

The following examples describe resins of the invention and how they are made.

EXAMPLE 1: Molar Ratio (F/P)=3.14

In a 4-liter reactor with cooling coil and stirrer, 9.992 kg of 90.8% phenol, 2.814 kg of water, 0.079 kg of lithium carbonate (1.11 moles/100 moles phenol), and 9.588 kg of 94.7% paraformaldehyde flakes were mixed at 30° C. The mixture was heated, at a uniform rate, while stirring, to 105° C. in one hour. An exothermic reaction started at 75° C. and heating was reduced. When the temperature reached 91° C., heating was stopped until the exotherm subsided. The condensation reaction was continued at refluxing temperature, 99°–103° C., until the resin viscosity reached about 444 cps. The reaction required 46 minutes, after the initial 1-hour heatup.

The resin was cooled quickly to 50° C. 0.224 kg of citric acid was added and the mixture stirred for 5 minutes. The acid dispersed completely. The resin was finally cooled to 25° C. The final viscosity was 627 cps at a solids content of 64.89%. Final pH was 4.55.

EXAMPLE 2: F/P=2.65

0.542 kg of 93.2% phenol, 0.003 kg of lithium carbonate (0.757 mole/100 moles of phenol) and 0.446 kg of 95.8% paraformaldehyde flake were reacted according to the procedure of Example 1. The refluxing temperature was maintained at 114°–115° C. for 50 minutes after 1-hour heatup. Then the reaction mixture was cooled to 90° C. and held for 15 minutes until the resin reached a viscosity of 452 cps.

The resin was cooled to 50° C. and neutralized with 0.0085 kg of citric acid. The final resin had a viscosity of 569 cps at 25° C., solids level of 72.63%, and pH of 4.33.

EXAMPLE 3: F/P=2.00

2.437 kg of 90.8% phenol, 0.009 kg of lithium carbonate (0.548 mole/100 moles of phenol) and 1.522 kg of 92.6% paraformaldehyde flake were reacted according to the procedure of Example 1. The refluxing temperature was maintained at 108°–110° C. The reaction was stopped when the resin viscosity was 443 cps. The reaction required 38 minutes, after an initial 1-hour heatup.

The resin was cooled to 50° C. and neutralized with 0.030 kg of citric acid at 50° C. with stirring for 5 minutes. The final resin had a viscosity of 569 cps at 25° C., a solids level of 72.8% and pH of 4.53.

EXAMPLE 4: F/P=5.00

167.8 g of 93.2% phenol, 62.6 g of water, 1.8 g of lithium carbonate (1.47 moles/100 moles phenol), and 267.8 g of 93.2% paraformaldehyde flake were reacted according to the procedure of Example 1. The paraformaldehyde was added in two portions. The refluxing temperature was maintained at 102°–103.8° C. for 63 minutes after the initial 1-hour heatup. The resin had a viscosity of 443 cps at this point.

The resin was neutralized as in Example 1. The cooled resin had a viscosity of 485 cps, solids level of 59.44%, and pH of 7.22, at 25° C.

EXAMPLE 5—NMR Data

Carbon-13 NMR spectra were obtained for the above examples using a Varian CFT-20 spectrometer manufactured by Varian Company of Palo Alto, California. Proton NMR spectra were obtained using a Varian EM 360A and a Perkin-Elmer Model R-24 proton NMR spectrometer manufactured by Perkin-Elmer Corporation of Santa Ana, Calif. The curve data were integrated to determined quantitatively how the formaldehyde charged to each reaction in the above example was distributed on the phenolic nuclei. The results are presented in Table 1.

TABLE 1

DISTRIBUTION OF FORMALDEHYDE IN THE UNCURED RESIN INTERMEDIATE

| Example | F/P Ratio | Catalyst Li$_2$CO$_3$ (moles/mole PhOH) | Distribution of Formaldehyde, Mole % of Indicated Group | | | | |
|---|---|---|---|---|---|---|---|
| | | | CH$_2$—O—CH$_2$OH (formals) | CH$_2$—O—CH$_2$ (ethers) | CH$_2$OH (methylols) | CH$_2$ (methylenes) | HCHO (free formaldehyde) |
| 3 | 2.00 | (0.55) | 32.8 | 6.6 | 38.3 | 10.8 | 11.5 |
| 2 | 2.65 | (0.76) | 36.2 | 8.4 | 20.5 | 16.9 | 18.1 |
| 1 | 3.14 | (1.12) | 34.4 | 7.8 | 27.7 | 15.9 | 14.6 |
| 4 | 5.00 | (1.47) | 37.4 | 5.1 | 9.4 | 10.1 | 38.0 |

TABLE 2

ADDITIONAL STRUCTURAL DATA

| Example | No. of Substituents Per Phenolic Nucleus | Titrated Free HCHO (Mole %) | Ratio Para/Ortho Methylols | Ave No. Ph Nuclei/ Molecule | MW (NMR) | Resin Solids % | Gardner-Holdt Viscosity |
|---|---|---|---|---|---|---|---|
| 3 | 1.43 | 8.0 | 0.17 | 1.81 | 257 | 72.8 | TU |
| 2 | 1.69 | — | 0.20 | 2.27 | 340 | 68.0 | ST |
| 1 | 2.16 | 12.4 | 0.24 | 2.64 | 435 | 64.9 | QR |

TABLE 2-continued

ADDITIONAL STRUCTURAL DATA

| Example | No. of Substituents Per Phenolic Nucleus | Titrated Free HCHO (Mole %) | Ratio Para/Ortho Methylols | Ave No. Ph Nuclei/ Molecule | MW (NMR) | Resin Solids % | Gardner-Holdt Viscosity |
|---|---|---|---|---|---|---|---|
| 4 | 2.05 | 23.1 | 0.19 | 2.73 | 483 | 59.4 | RS |

COMPARISON WITH PRIOR ART RESINS

Three resins of the prior art, selected because of similarities of qualitative characterization of the resin or process with the resins of this invention, were made according to the teachings of the publications describing them. The structures of these resins with respect to formaldehyde distribution on the phenol nuclei were then measured using carbon-13 and proton NMR analysis. The following examples describe the process of their manufacture and resulting spectra.

EXAMPLE 6: Pantke Resin (U.S. Pat. No. 1,909,786) F/P=2.52

1.805 kg of 100% phenol and 1.532 kg of 94.5 paraformaldehyde flake were mixed thoroughly at 50° C. with 268.8 g of 20% NaOH solution (7.07 moles/100 moles phenol). The mixture was heated rapidly to 60° C. An exothermic reaction began at 53° C. and cooling maintained the mixture temperature at 65° C. for 3 hours.

The resulting resin was cooled to room temperature and a 1 kg sample taken. This portion of the resin (Pantke resin intermediate resole) was stabilized by mixing with 0.031 kg of lactic acid. The intermediate had a viscosity of 627 cps at 74% solids and a pH of 7.65.

The other portion of the resin mixture was dehydrated under 24″ Hg vacuum for about 30 minutes until the pot temperature of the reactor reached 65° C. Then 0.084 kg of lactic acid was added and thoroughly mixed. The resulting product had a viscosity of 2930 cps at 79.6% solids content and a pH of 7.00.

EXAMPLE 7: Klemke (U.S. Pat. No. 3,634,317) F/P=2.63

0.010 kg of triphenyl phosphite, 0.190 kg of 100% phenol, 0.200 kg of 40% formaldehyde and 5.0 ml of 40% NaOH solution were mixed and heated rapidly to reflux at 102° C. Cloudiness appeared after 1 hour 16 minutes at which time 0.200 kg of 40% formaldehyde was added. Refluxing of the mixture was continued for 8 minutes, after which viscosity was 200-250 cp.

The resin was cooled to 40° C. and dehydrated between 30°-39° C. until a clear resin was obtained after removing 0.234 kg of $H_2O$. The resulting resin had a solids content of 77.7% and a pH of 7.10.

EXAMPLE 8: Vansheydt & Simonova, "Production of Colorless Resins From Phenol and Formaldehyde," Plasticheskie Massy, Sbornik Statei: pp 129-140 (1939)

0.412 kg of 100% phenol, 0.0123 kg $Na_2CO_3$ catalyst and 0.527 kg of 49.9% formalin were charged to a stirred reactor at room temperature. The catalyst comprised 3% by weight, based on phenol (2.65 moles of $Na_2CO_3$/100 moles of phenol). The F/P ratio was 2.00. The mixture was heated to 95° C. over 30 minutes. This temperature was maintained for 75 minutes, after which phase separation began.

The resin was quickly cooled to 50° C. and neutralized with 0.031 kg of citric acid monohydrate. The resin mixture was allowed to stand overnight at room temperature. The resulting supernatant layer was drawn off and discarded. The final resin had a pH of 4.5, a solids content of 67.8% and a viscosity of 2700 cps.

Table 3 indicates the results of the carbon-13 proton NMR analysis of the prior art resins.

TABLE 3

DISTRIBUTION OF FORMALDEHYDE IN RESIN - PRIOR ART

| | | | Distribution of Formaldehyde, Mole % of Indicated Group | | | | |
|---|---|---|---|---|---|---|---|
| Example | F/P | Catalyst (Mole %) | $-CH_2-O-$ $CH_2-OH$ (formals) | $-CH_2-O-$ $CH_2-$ (ethers) | $-CH_2OH$ (methylols) | $-CH_2-$ (methylene) | HCHO (free formaldehyde) |
| 6(a) (Pantke-dehydrated) | 2.52 | NaOH (7.07) | 24.6 | 5.6 | 54.8 | 9.6 | 4.6 |
| 6(b) (Pantke) | 2.52 | NaOH (7.07) | 24.4 | 6.5 | 54.7 | 7.8 | 6.5 |
| 7 (Klemke) | 1.80 | NaOH (3.51) | 13.0 | 4.9 | 48.0 | 30.9 | 3.3 |
| 8 (Vansheydt et al) | 2.00 | $Na_2CO_3$ (2.65) | 11.2 | 3.3 | 47.4 | 37.4 | 4.7 |

Panke of Example 6 was chosen as close prior art because of its recited low-color and fire-retardant properties. Comparing the Panke process with that of the resin of this invention, Panke uses considerably greater amounts of alkaline catalyst in the initial reaction. The effect of this is seen in comparing the carbon-13 NMR structural data of Table 3 with those of Table 1. The Panke resin is comprised of a lower amount of formals and higher amount of methylols. The finished resin of Panke is not water dilutable. The resulting resin is described as suitable for casting in open molds and requires about 100-200 hours to cure at 78°-82° C. A plasticizer, generally glycerin, is required to keep the resin in a liquid form suitable for casting. The long cure time required of Panke would render it unsuitable for commercial laminate production. Increasing cure temperature to improve curing times appears limited since the inventor admits that the low-color advantage is destroyed above 100° C. No significant structural differences appear to result from the dehydration procedure used by Panke.

Klemke, of Example 7, describes a low-color, base-catalyzed resin. Here 3.51 mole percent NaOH and 1.6 mole percent triphenyl phosphite are used as catalysts. Referring to the NMR data, the Klemke resins have significant formal groups but only about half that of the resins of the invention. There is a comparable level of methylols. The process is complex, requiring a two-step addition of formaldehyde. The resole requires a 30-45% alcohol dilution to form a suitable laminating resin.

The Vansheydt article, Example 8, describes another low-color resin. The end product is a white, solid resin. For purposes of comparison of structure, a sample of the Vansheydt resin intermediate was taken just after phase separation of water had occurred. The processes of making the Vansheydt and resins of this invention are generally similar, except for levels of catalyst used and cooking times. The process of this invention uses about half the catalyst used by Vansheydt. The carbon-13 NMR results show that the Vansheydt resin comprises a relatively minor amount of formals, higher levels of methylol and a large amount of methylene bridges. The Vansheydt resin cannot be used for laminating without an organic solvent, if conventional laminating equipment were used. It is also noted that Vansheydt's resins require extended curing times of 100-120 hours at 80°-85° C. in order to retain low color.

In sum, significant process differences between the prior art low-color resins and the resins of this invention appear in the level of base catalyst usage and in time-temperature relationships during the cooking process. The 0.50-2.2, preferably 0.5-1.5, moles of catalyst per 100 moles of phenol used in the process of this invention cause the reaction mixture to remain in the pH range of about 7.0-10.9, preferably 2.1-8.2, during cooking. A low level of base catalyst seems critical to bring about the observed unique, relatively high-formal and low-methylol group contents of the resins. These structural differences result in the resin intermediate characteristics that permit use of the resin in conventional glass laminating processes. This stable "window" of the resin of this invention, during which the resin remains in a workable viscosity range over a relatively wide temperature range, is not exhibited by Vansheydt or by any other known P/F resin.

One of the more subjectively measured characteristics of the resin of the invention is its initial low color and color stability over time, even after exposure to curing temperatures of about 150° C. At temperatures in the 150°-175° C. range, absorption of blue-green radiation increases slightly so that the resin appears light yellow. From 175°-212° C., the yellow brightens. Not until the 212°-225° C. range is there overall darkening of the resin. All of the prior art resins darken appreciably at the 100° C. level.

THE RESIN MAKING PROCESS

The general process of the invention comprises the steps of: (a) mixing together reactive materials at room temperature; (b) heating the mixture to reflux conditions over a period of about one hour; (c) refluxing the mixture until the resulting resin reaches a desired viscosity range; (d) cooling the reaction to 50° C.; and (e) adjusting the pH of the mixture to 3.0-8.0 with a weak acid.

The basic starting materials are phenol, formaldehyde and an alkaline catalyst. These materials may be of commercial grade and in any of several physical forms. Initially, phenol and the catalyst are mixed with water. The water may make up about 30% by weight of the reaction mixture, depending upon the solids content desired in the finished resin. Formaldehyde is then charged to the reaction, preferably in the form of flake paraformaldehyde. The mixture is warmed to about 30° C. to ensure rapid dissolution of the materials.

The pH of the reaction mixture is controlled between 7.0-10.9. The preferred range is 7.2-8.2. Almost any alkali material may be used as a catalyst in the initial addition reaction. For example, any of the well-known alkali metal hydroxides, carbonates or alkaline earth metal oxides may be used. Lithium carbonate catalyzed resins have particularly good low-color characteristics. Lithium carbonate is also preferred because its limited solubility in the reaction mixture acts to self-regulate pH in the desired range. Calcium carbonate, magnesium carbonate and calcium hydroxide have been used successfully. Other useful catalysts are p-toluene sulfonic acid, sodium carbonate or ammonium sulfate. With potassium or sodium hydroxide, a careful step-wise addition is required to adequately control pH.

Only a small amount of catalyst is permitted for the process of this invention, in contrast with prior art resin making processes. The lower catalyst level of this invention is a critical process limitation and favors distribution of formaldehyde as benzyl formal functional groups. Higher levels of alkali also tend to give more highly colored end products. With lithium carbonate, for example, as little as 0.5 mole per 100 moles of phenol (0.5 mole percent) charged to the process is sufficient, at a formaldehyde to phenol ratio (F/P) of 2:1. As much as 2.2 mole percent may be used, however, without adversely affecting the process. A preferred range is 0.5-1.5 moles of catalyst per 100 moles of phenol.

There are other advantages resulting from the low level of catalyst required for the process of this invention. For example, the low inorganic salt content improves aging characteristics of finished products. Fire properties are improved since the presence of inorganic salt makes a high contribution to the smoldering or "punking" characteristics of a phenolic. Electrical insulating properties are improved by keeping salt content low.

Generally, a lower catalyst concentration significantly increases the time required to complete the initial reaction. For example, at F/P=2, a typical reaction time, from room temperature mixture to a resin at a desired viscosity end-point, requires about 2.3 hours at 0.26 mole percent catalyst. At a 1 mole percent catalyst level, the typical reaction time is about 1.5 hours. However, the presence of catalysts much in excess of a 2.2 mole percent level, coupled with lower cooking temperatures, appears to favor higher methylol group formation than desirable in the end product.

The ratio of formaldehyde to phenol (F/P) is important in determining the characteristics of the finished resins, relative to one another, and determines which end use is appropriate to the particular product. The resins of this invention, exhibiting carbon-13 NMR spectra as shown in the drawings, may be made with F/P ranging from about 1.9 to about 5.0 moles per mole phenol. These resins, having high formal and low methylol group content characteristics, are particularly suitable for making resin-glass laminates, although they are not so limited. For example, adhesives and foams can be made with the resins of this invention. The F/P=5.0 resin may be used as a formaldehyde donor resin hardener.

The change in the F/P ratio changes only the relative quantities of the functional groups. As shown in the drawings, the carbon-13 NMRs are basically qualitatively identical, regardless of the F/P ratio.

An F/P ratio of at least 1.9 appears to be critical in obtaining significant benzyl formal linkages. If the ratio is much lower, a larger percentage of the formaldehyde charged to the reaction mixture is found in the resin as methylols, as known in the prior art structures. These high methylol content resins exhibit the usual rapid curing characteristics of the resins known in the art and are thus much less suitable for making laminates, as discussed above. At lower F/P ratios, more methylene bridges also result as is likewise known in the art.

F/P ratios greater than 5 are of limited interest since additional formaldehyde does not combine, or at least stably combine, with phenol. It remains in a relatively free state, evolving as a troublesome gas if the resin is heated.

At low catalyst concentrations, there is a need to keep the reaction temperature high in order to get reasonable cooking times. Thus, reaction mixture is increased from room temperature, with stirring, to reflux temperatures. The heating rate is about one hour from room temperature to boiling, at atmospheric pressure.

The reflux temperature is a function of the composition of the mixture, but typically is in the 95°–115° C. range. Lower temperatures require more time. For example, decreasing the reaction temperature by 20° C. may require twice as much time to cook the resin. The mixture is held at reflux temperature during which period formaldehyde attaches to the reactive ortho and para positions on the phenol ring as methylols or as methylol formals.

The addition reaction is stopped before the desired degree of water dilutability is lost. The exact end point depends upon the product application sought.

The end point of the addition reaction chosen depends upon the solid content of the resin to some extent. The resins of the invention are high solids content resins ranging between 50–78% solids by weight of the finished resin. This may be increased to 88–90% with vacuum dehydration. The finished solids content may be varied by varying the amount of water in the initial reaction mixture. Solids content for an F/P=3.14 resin typically ranges between 52–67%. For an F/P=2.0 resin the range is 59–78%.

At average solid contents the resins of these inventions will attain viscosities ranging between 400–2600 centipoise. As a matter of convenience, the reaction end point is often determined based on viscosity. The finished resin is water dilutable. The following table shows typical dilutions as a function of F/P.

TABLE 4(a)

| Dilutability of Invention Resins with Water | | | |
|---|---|---|---|
| F/P | 2.00 | 3.14 | 4.50 |
| Resin: water (25° C.) | 0.55 | 0.06 | 0.54 |

For making laminates, the resin must be dilutable with nonflammable alcohol-water solvents. The following table indicates dilutability of the resins of this invention in low concentration alcohol solutions.

TABLE 4(b)

| Solubility of Invention Resins in Low Concentration Alcoholic Solutions | | | | |
|---|---|---|---|---|
| Solvent (Wt. % Isopropyl Alcohol in Water) | Parts Resin Soluble Per Part Solvent at Indicated F/P Mole Ratio | | | |
| | F/P = 2.00 | 2.25 | 2.75 | 3.14 |
| 20% | 0.5:1 | 3.5:1 | 8.6:1 | 0.5:1 |
| 25% | 1.25:1 | 12:1 | >20:1 | 1.05:1 |
| 30% | 3.35:1 | — | — | 8.1:1 |

After the end-point is reached, the reaction mass is cooled to substantially halt the addition reaction. A temperature of 50° C. is typical.

As a final step, the cooled resin is treated with an acid to adjust the pH of the mixture to a range of 3–7. Any acid may be used to provide the necessary stabilizing neutralization. Weak, polycarboxylic acids have been found to be most convenient for control in commercial processes. Lactic, citric and oxalic acids have been successfully used. Inorganic acids such as hypophosphorous, hydrochloric or even sulfuric acids have been used, although controlling acidity is much more difficult with the stronger acids, because of localized reactions. The preferred acid is citric acid.

Color level is reduced and color stability is also improved by neutralizing the basic catalyst. The neutralization apparently suppresses the formation of color compounds or at least causes those present to remain in a form that is colorless in the visible light range. Storage stability of the resin is also improved, permitting holding of the resin in an uncured state at ambient conditions for at least six months.

The characteristics of the resins of this invention constitute a "window" of viscosity and temperature that can be employed in producing laminates from these resins. The window effect refers to the fact that the resin remains in a flowable or workable condition, able to penetrate reinforcing substrates at temperatures and pressures typical of those now used to produce polyester or epoxy laminates. No other phenol formaldehyde resins are known which can be processed into laminates under the conditions typically used for processing epoxies and polyesters into laminates.

GLASS-FIBER LAMINATES

EXAMPLE 9: Glass-Fiber Laminates

The resole resins of this invention from Examples 1 and 3, described above, were used in making laminated products with glass-fiber cloth. The resins were used without solvent dilution.

Laminates are made up of layers of prepregs. A "prepreg" is defined as a base or substrate material, usually glass or cellulosic, that has been impregnated with a liquid resin and, subsequently, at least partially B-staged.

The laminating cloth selected was Uniglass style 7781 glass fabric manufactured by Uniglass Industries of New York, N.Y. This material is commonly used in structural and semi-structural composite applications in the aerospace industry.

A silane fabric finish, UM 696 or UM 827-S, furnished by Uniglass Industries of New York, N.Y., was applied to the fabric for improved resins-glass interface bonding. Both finishes are commonly used with epoxy, phenolic and polyimide laminating resins.

The resin was continuously applied to glass cloth. Final resin content of the cloth was adjusted by passing the saturated fabric through the nip of a pair of chrome plated steel squeezing rollers. The saturated cloth was then passed though a drying oven for a short period of time at moderate temperature. The oven heat partially cures, advances or B-stages the resin. B-staging increases the viscosity of the resin so it is retained by the cloth during further processing into laminates.

The following table outlines the characteristics of the impregnated fabrics or prepregs.

TABLE 5

B-STAGED RESIN IMPREGNATED GLASS CLOTH

| Resin (Ex.#) | Roll Gap (in.) | Oven Speed (ft/min) | Exposure Time (min) | Oven Temp (°C.) | Resin Content (wt. %) | Volatile (wt. %) | Flow (%) | Gel Time (min/sec) |
|---|---|---|---|---|---|---|---|---|
| 1(a) | 0.5 | 0.5 | 5.4 | 121–124 | 44.8 | 1.42 | 22.3 | 2'41" |
| 1(b) | 0.45 | 0.5 | 5.4 | 122–123 | 40.4 | 1.24 | 11.8 | 3'50" |
| 1(c) | .48 | 0.5 | 5.4 | 118–127 | 38.5 | 1.59 | 16.5 | 2'53" |
| 1(d) | .46 | 0.5 | 5.4 | 121–123 | 40.0 | 1.40 | 12.4 | 3'28" |
| 1(e) | .48 | 0.75 | 3.6 | 121 | 39.1 | 2.14 | 23.2 | 6'35" |
| 1(f) | .48 | 1.0 | 2.7 | 121 | 35.9 | 2.08 | 23.7 | 7'36" |
| 3(a) | .48 | 0.5 | 5.4 | 132–138 | 42.1 | 1.63 | 19.3 | 6'14" |
| 3(b) | .48 | 0.5 | 5.4 | 133–137 | 40.9 | 1.54 | 19.3 | 7'38" |
| 3(c) | .55 | 0.5 | 5.4 | 118 | 43.9 | 3.68 | 30.6 | 13'54" |
| 3(d) | .48 | 0.5 | 5.4 | 134–138 | 41.4 | 1.50 | 18.9 | 5'42" |
| 3(e) | .50 | 0.25 | 10.8 | 132–138 | 41.7 | 0.99 | 12.5 | 6'13" |

A typical prepreg specification for the impregnated cloth for producing laminates having suitable tensile, flexural and compressive strengths for structural use is: (1) 41±3% resin content; (2) 5–27% flow; (3) 2–18 minutes gel time; and (4) less than 1.5% volatile content.

The resin solids weight percent content is determined by heating a resin-filled specimen in an air circulating oven at 250°±5° F. for 10 minutes, cooling in a desiccator and weighing. The specimen is then placed in a muffle furnace at 1050°±50° F. until the resin is completely burned away. The remaining material is weighed and the percent resin solids content calculated.

"Flow" is determined in accord with U.S. Gov Specification MIL-G-55636 entitled Glass Cloth, Resin Pre-impregnated (B-Stage).

"Gel time" is determined by placing a number of specimens in a press between platens heated to 250°±5° F. Sufficient pressure is applied to create a bead of resin around the edge of the test specimens. A stop watch is started as soon as press pressure is applied. The resin bead is probed with a wood or glass rod until the specimen has gelled, indicated by the bead's reaching a rubbery "feel" or texture. Elapsed time is "gel time."

Percent volatiles is determined by weighing a specimen followed by heating in an air circulating oven regulated at 250°±5° F. The sample is cooled in a desiccator and reweighed. The weight percent volatiles may then be calculated from the weight data.

The finished resin content of the prepreg is determined by the solids content, viscosity and temperature of the particular resin used. Resin content, as well as other important characterisitics such as flow, volatiles content and gel time can also be varied by changing the gap setting on the roll nip, the speed of sheet through the curing oven and oven temperature.

Referring to Table 5, the maximum B-stage temperature for the Example 1 (F/P=3.14) group appears to be 125°±5° C. for a 5-minute oven exposure time, if the desired specifications outlined above are to be met. Blistering occurs at temperatures above 125°–130° C.

The maximum B-staging temperature in the oven for Example 3 resoles appears to lie between 135°–145° C. Blistering occurs at 145° C. The specifications for structural laminates, indicated above, are met using oven exposure times of 5.4–10.8 minutes at 125°±5° C. These conditions repeatably produce impregnated cloth from which good press grade laminates can be made, as discussed below. Example 1(c) indicates that if the staging temperature is too low, advancement may not be adequate. Volatiles, flow and gel time are higher than the selected specification ranges, where staging is inadequate.

Generally the gel times of Example 1 are half those of the the Example 3 resoles. Example 3 group resin wetout of the glass fabric, as evidenced by resin retention, is superior to that of the Example 1 resins. Example 3 resins advance slower than the Example 1 group but can be B-staged at higher temperature.

The last three examples of group 1, 1(d)–1(f), indicate the relationship between the length of oven exposure time and final impregnated cloth characteristics. There appears to be little difference between 2.7 and 3.6 minutes. The longer times of 5.5 minutes produces improved advancement, as indicated by higher resin content and lower volatiles, flow and gel time.

Where low ambient temperatures prevail, high viscosities can cause processing difficulties. Warming of the starting materials to about 30° C. prior to impregnation of the glass overcomes these problems. Alternatively, a dilute solution of alcohol in water can be used to modify viscosity. The concentration of the alcohol solution used should be minimized to decrease handling of flammable liquids.

Following B-staging, the finished impregnated cloths or "prepregs" containing the resins of Examples 1 and 3 were cut to size. Twelve plies of impregnated cloth were stacked between two flat press plates to make up the body of the laminate or a "precure" laminate. The press was then closed and heated to curing temperature.

The critical temperature for cure initiation appears to be about 100° C. for both of the Examples 1 and 3 resin groups. Press closing pressure, cure time, and press cycling were varied, as indicated in Tables 6 and 7, to determine curing conditions. The object of the trials was to produce structural laminates having physical strengths and other characteristics comparable to resin-glass laminates made from epoxies and polyimides, and better than laminates as previously produced from phenol-formaldehyde and polyester resins. The following Tables 6 and 7 exemplify the laminates of this invention.

TABLE 6
12 PLY GLASS-RESIN LAMINATE TEST RESULTS
FINISHED LAMINATE CHARACTERISTICS

| CURE CONDITIONS | | RESIN USED Resin From Indicated Example | Resin Content | Flexural Strength (Fed 406 Method) (psi) | Flexural Retention 2 hour Water Boil (ASTM D-790) (psi) | Flexural Strength Post Cure 2 hrs. @ 125° C. (ASTM D-790) (psi) | Compressive Strength (Fed 406 Method) (psi) | Tensile Strength (Fed 406 Method) (psi) | Flexural Modulus (ASTM D-790) (psi × 10⁶) |
|---|---|---|---|---|---|---|---|---|---|
| Cure[1] Temp. (°C.) | Cure Time (min) | | | | | | | | |
| 120 | 60 | #1 | 34.1 | 100,700 | 84,600 | 107,400 | 72,700 | 76,000 | 3.42 |
| | | #3 | 39.1 | 85,000 | 58,100 | 100,400 | 61,900 | 72,200 | 2.87 |
| 140 | 60 | #1 | 35.4 | 106,400 | 104,400 | 105,700 | 70,700 | 71,400 | 3.76 |
| | | #3 | 38.8 | 97,100 | 79,500 | 96,900 | 60,000 | 68,700 | 3.36 |
| 150 | 60 | #1 | 32.8 | 106,200 | 101,500 | 101,700 | 69,700 | 64,700 | 3.83 |
| | | #3 | | | | blistered; not measured | | | |
| 140 | 45 | #1 | 32.6 | 107,700 | 97,900 | 108,100 | 67,500 | 70,000 | 3.84 |
| | | #3 | 39.7 | 95,500 | 74,600 | 96,600 | 61,700 | 72,400 | 3.25 |
| 140 | 75 | #1 | 32.3 | 110,600 | 106,200 | 98,500 | 70,700 | 68,900 | 4.04 |
| | | #3 | 38.6 | 98,500 | 81,500 | 102,600 | 60,100 | 72,700 | 3.30 |
| 140 | 90 | #1 | 35.3 | 100,400 | 97,200 | 86,500 | 64,000 | 58,700 | 3.73 |
| | | #3 | 37.9 | | | blistered; not measured | | | |

Notes:
[1]The laminate was heated straight up to indicated cure temperature, at a uniform rate, over a 30-min. period.
[2]Press closure pressure in each case was 50 psig.
[3]Pressure was applied with plys at ambient temperature, held during curing and subsequent cooling, and released when laminate had reached ambient.

TABLE 7
12 PLY GLASS-RESIN LAMINATE TEST RESULTS CONTINUED
FINISHED LAMINATE CHARACTERISTICS

| CURE CONDITIONS | | RESIN USED Resin From Indicated Example | Resin Content | Flexural Strength (Fed 406 Method) (psi) | Flexural Retention 2 hour Water Boil (ASTM D-790) (psi) | Flexural Strength Post Cure 2 hrs. @ 125° C. (ASTM D-790) (psi) | Compressive Strength (Fed 406 Method) (psi) | Tensile Strength (Fed 406 Method) (psi) | Flexural Modulus (ASTM D-790) (psi × 10⁶) |
|---|---|---|---|---|---|---|---|---|---|
| Press Pressure (psig) | Press Program | | | | | | | | |
| 15 | Contact pressure - 30 min; Indicated pressure - 45 min. | #1 #3 | 35.6 40.7 | 102,900 88,900 | 90,000 67,200 | 96,100 88,700 | 67,100 63,100 | 60,900 69,400 | 3.56 2.99 |
| 20 | Contact pressure - 30 min; Indicated presusre - 45 min. | #1 #3 | 39.3 43.6 | 83,600 73,500 | 72,000 56,100 | 92,500 83,600 | 62,400 55,200 | 58,200 62,200 | 2.97 2.73 |
| 100 | Contact pressure - 30 min; Indicated pressure - 45 min. | #1 #3 | 38.8 43.1 | 92,900 77,600 | 80,600 59,710 | 97,000 87,400 | 65,400 55,600 | 61,900 63,500 | 3.19 2.80 |
| 200 | Contact pressure - 30 min; indicated pressure - 45 min. | #1 #3 | 39.4 43.1 | 88,900 75,400 | 77,200 57,000 | 94,600 87,600 | 62,400 59,400 | 59,400 62,200 | 3.21 2.86 |

Notes:
1. The laminate was heated straight up to indicated cure temperature, at a uniform rate, over a 30-min. period.
2. Cure time in each case was a total time of 75 minutes, including heating from room temperature and holding at cure temperature.
3. Cure temperature for each trial was 130° C.

The objective in pressing and curing the laminate is to keep the resin fluid long enough to obtain controlled migration of the resin, removal of air and bonding of the plies. At the same time, the resin must be retained in the cloth and not lost by flowing out of the press. Good resin to glass bonding is indicated by high compressive strengths. Good resin encapsulation of glass fibers is shown by high tensile strengths. The laminates should be resistant to attack by water. For example, a good laminate glass-thermoset resin composition normally retains a high percentage of its tensile strength after 2 hours in boiling water.

As a comparison, a commercial laminate made of epoxy resin may be characterized as having the following strengths: flexural strengths of 85,000 psi; compressive strengths of 59,000 psi; and tensile strengths of 71,600. Typical polyimide laminates have approximately the following strengths: flexural of 99,200 psi; compressives of 70,000 psi; tensiles of 71,600; and a flexural modulus of $3.8 \times 10^6$ psi. Upon review of the tables, it is seen that the resoles of this invention produce laminates of comparable strengths to the known laminates.

A study of the effect of press curing temperatures was made. The laminate was enclosed in the press at 50 psig at room temperature. Temperature was increased to the curing temperature selected and was held there for 60 minutes. The laminate was held under pressure after curing until cooled to room temperature. The data indicates that 135°±5° C. is the best cure temperature for both Examples 1 and 3 resin groups (F/P ratio or 2–3.2), with respect to wet flexural strength. Maximum cure temperature for the Example 1 resoles was 140° C. Higher temperature resulted in blistering and delamination. Flexural strength did increase with increased press temperature, however. For example, Example 1 strengths increased from 85,000 psi cured at 120° C. to 97,000 psi when cured at 140° C., an improvement of 14.2%. Compressive and tensile strengths decreased 3.2 and 3.6% respectively. Both resin examples exhibited decreasing compressive and tensile strengths as the cure temperature increased.

For groups of laminates prepared from the Example 3 resoles, lowering cure temperature to 100° C. from 130° C. improved resin retention by 3%. However, at the lower cure temperatures a higher percentage of volatiles is retained in the laminate. Limiting volatiles; i.e., including free formaldehyde, to low levels is, of course, important for commercial operations. Curing temperatures at 140° C. produced lower compressive strengths (Example 3—67,400 psi; Example 1—61,000 psi) than previous tests, indicating that 140° C. is probably exceeding the optimum temperature for good bonding with the silane finish system.

Water absorption of the laminates prepared from Example 3 increased as the cure temperature exceeded 130° C. Tensile strengths decreased with increasing cure temperature time.

A series of laminates was made, varying cure times between 45, 60, 75, and 90 minutes. The curing temperature and press closing pressure were held constant at 140° C. and 50 psig, respectively. The laminate was heated up to 140° C. over a 30-minute period, held for the selected period of cure time and cooled to room temperature.

For Example 3 laminates, dry flexural strength was highest at 45 and 60 minutes of cure. Maximum wet flexural retention appears to be obtained with the extended cure times. Tensile strength decreases as time is increased. For example, at 45 minutes, tensile was 70,000 psi while at 90 minutes it declined to 58,700 psi.

For Example 1 laminates, flexural strengths remained fairly unchanged regardless of cure time. However, 90 minutes at 140° C. resulted in some blistering and delamination. Basically, the results indicated that a longer cure and lower temperature is preferred to shorter cures at higher temperature.

The temperature program used for curing laminates under pressure was varied to determine its effect on finished laminates, recognizing that substantial curing does not begin until about 100° C. The data showed that temperature curing cycles in two steps, four steps or straight up to the selected cure temperature do not affect retention of resin in the laminate. As an example, a press cycle was tried wherein the laminate at 50 psig was heated from room temperature to 100° C. and held for 65 minutes; heated to 130° C. and held for 75 minutes; and cooled to room temperature over 30 minutes.

No significant change in finished laminate products resulted when compared with a one-step straight-up curing at 130° C. Laminate strength slightly improves with slow temperature rise but is not drastically reduced by faster rates. This suggests that large parts could be satisfactorily prepared where bulk size may require slow rates of heating. There were only minor differences between the cycles. Heating straight up to curing temperature is preferred because it is the least time consuming.

A study was made of the pressing schedule and press pressures to determine their effect on laminate characteristics. Cure conditions were fixed at 130° C. for 75 minutes. The laminate was heated straight up to the 130° C.

The object of the pressing schedule test was to improve resin retention. The technique used was to hold the laminates at contact pressure; i.e., less than about 15 psig, for varied periods of time before increasing pressure for finish curing. The precure laminate was heated to 130° C. over a 30-minute period. The holding period thereafter at contact pressure was varied up to 30 minutes. The data indicated that at least 10 minutes was required to reduce resin loss appreciably. Significant improvement was obtained at 30 minutes holding time. For example, the Example 3 laminate group yielded laminates containing 39% resin from a 43% prepreg impregnated cloth level. For the Example 1 group, retention was 100% resulting in a 43% resin content of the finished laminate. The delayed pressure technique, of course, adds 30 minutes to the curing process time. A post-cure test indicated an increase in laminate strength of about 10,000 psi whereas laminates in previous tests at similar temperatures and time increased only 2,000 psi. This indicates a longer time may be required to fully cure the resin when the delayed press technique is used.

For the cure pressure variation study, the laminate was held for 30 minutes at 130° C. at contact pressure prior to the cure pressure application. The laminate was then held for 45 minutes under pressure. Selected pressures were 15, 20, 100 and 200 psig. Results showed that increased pressure results in decreased thickness and higher specific gravity. The laminates prepared at 15 psig exhibited good laminate characteristics. Example 3 laminates having an initial 38% resin content produced cured laminates of 35% resin content having a flexural strength of 102,900 psi.

Under similar staging and pressing conditions, Example 1 resins yield laminates with a higher resin content than Example 3 resins. Tensile strengths of Example 1 laminates are actually higher than those made from Example 3 resins, where resin contents are equal. Previously higher resin content of Example 1 laminates may have concealed the fact that the Example 1 resins yield stronger laminates where resin contents are equal. Example 1 laminates have a lower compressive strength. Thermal stability of the Example 1 resins is not as good as the Example 3 resins.

In sum, the studies of the conditions under which laminates can be made, with strengths and other characteristics comparable to or better than those previously known, demonstrates that a relatively wide range of working parameters, when compared to the previously known p-f laminating processes, yield acceptable results. This suggests that a laminator should be able to select a set of conditions that will produce satisfactory results within the design limits of his existing laminating line. The data does show that there are curing temperature limits beyond which blistered and delaminated products results. A lower limit appears to exist, where there is concern for the presence of excess volatiles, including free formaldehyde, in the finished laminate or workplace. Satisfactory laminates can be produced at low pressure. This indicates that vacuum bag curing should work as well as press curing.

An important advantage of the resoles of this invention, as pointed out above, is that laminates therefrom have the fire-resistant characteristics that are inherent in the typical phenol-formaldehyde resins. These characteristics can now be incorporated in laminated products using the procedures shown in the above examples.

One means of measuring flammability is an Oxygen Index (OI) test. The Oxygen Index is defined as the minimum concentration of oxygen, expressed in volume percent, in a mixture of oxygen and nitrogen, that will just support flaming combustion. The test apparatus employed conformed to ASTM D 2863-70. Samples tested were the neat, undiluted (100%) resins, the 12-ply resin-glass laminate described above and a single-ply resin-glass sheet. Tests were run on a polyimide, phenolic, epoxy, melamine and Furan resins. The neat resin samples were cast or molded and then machined to specimen size. The resin and resin-glass laminated samples were 6.5 mm wide by 3.0 mm thick by about 100 mm long. The single-ply tests used examples of 52 mm by 140 mm by 0.25 mm.

Tables 8 and 9 report Oxygen Index values for the above-indicated resins.

TABLE 8

OXYGEN INDEX V TEMPERATURE - NEAT RESINS

| | Room Temperature | 100° C. | 300° C. |
|---|---|---|---|
| Example 1 (invention) | 43 | 36 | 31 |
| Melamine | 27 | 26 | 21 |
| Phenol-Formaldehyde | 25 | 23 | 12 |
| Polyimide (Polyamine bismaleimide) | 27 | 26 | 19 |
| Epoxy I (Bisphenol A Epoxy) | 23 | 22 | 13 |

TABLE 9

OXYGEN INDEX V. TEMPERATURE RESIN-GLASS LAMINATE

| | | OI at Temperature | | |
|---|---|---|---|---|
| Resin Tested | % Resin Content | Room Temp. | 100° C. | 300° C. |
| Example 1 (invention) | 32 | 67 | 62 | 46 |
| Melamine | 39 | 56 | 50 | 34 |
| Polyimide | 30 | 45 | 42 | 31 |
| Phenol-Formaldehyde | — | 25 | 23 | 12 |

The results indicate that the OI drops with increasing resin content. This is to be expected since the remaining constituents of the laminate are inert glass. The single-ply samples gave consistently higher values of OI than the neat samples and laminated specimens of the same resin.

Table 10 reports comparative measurements of the smoke evolved when laminates are exposed to flame. The data shows that the resins of this invention produce laminates that have a much lower relative smoke evolution than those produced from competing resins. The NBS smoke density test is described in NBS Technical Note No. 708 Appendix II utilizing an Aminco NBS Smoke Chamber.

TABLE 10

SMOKE DENSITY - NBS SMOKE DENSITY CHAMBER

| | Maximum Specific Optical Density | |
|---|---|---|
| Laminate | Flaming Conditions | Nonflaming Conditions |
| Example 1 | 0.4 | 0.3 |
| Example 3 | 0.4 | 0.4 |
| Polyester | 60 | 69 |
| Melamine Formaldehyde | 94 | 44 |
| Urea Formaldehyde | 50 | 43 |
| Phenolic | 54 | 20 |
| Epoxy | 59 | 19 |

What is claimed is:

1. A process for forming a heat-curable, phenol-formaldehyde glass fiber prepreg, including a glass fiber substrate, comprising:
    saturating said substrate with a phenol-formaldehyde resin characterized by a formaldehyde to phenol ratio of 1.9–5.0:1 and by carbon-13 nuclear magnetic resonance sprectra as having at least 30% by weight benzyl formal groups of the form $Ph—(CH_2O)_n—CH_2OH$, $n \geq 1$, less than about 20% by weight methylene groups of the form $Ph—CH_2—Ph$ and less than about 40% by weight methylol groups of the form $Ph—CH_2OH$, wherein Ph is a phenol nucleus;
    squeezing said saturated substrate until the desired level of resin is contained in the web, and;
    heating said matrix at 110°–140° C. until a desired level of resin content is fixed in the web and the concentration of volatile materials remaining does not exceed 1.5 weight percent.

2. The heat-curable phenol-formaldehyde resin-glass fiber prepreg of claim 1.

3. The process of claim 1 wherein said resin is characterized by a formaldehyde to phenol ratio of 1.9–2.75:1 and the process cure temperature is 110°–125° C. for at least 2.0 minutes.

4. The process of claim 1, wherein said resin is characterized by formaldehyde to phenol ratio of about 2.75–3.5:1, and the process cure temperature is 125°–140° C. for at least about 2.0 minutes.

5. The process of claim 1 wherein the product of said process is formed into a fire-resistant phenol-formaldehyde resin-glass fiber laminate by additional processing steps, comprising:
    shaping the heat-curable phenol-formaldehyde resin-glass fiber prepreg of claim 1 into single sheets;
    assembling a plurality of said sheets into a precure laminate;
    pressing said precure laminate at contact pressure of about 2–15 psig;
    heating said precure laminate, simultaneously with pressing at contact pressure, to about 100°–130° C. for at least about 10 minutes;
    pressing said precured laminate at greater than contact pressures, in the range of 15–200 psig;
    heating said laminate, simultaneously with pressing, to about 100°–140° C. until the laminate is cured to a uniform, insoluble, infusible state.

6. The heat-curable phenol-formaldehyde resin-glass laminate of claim 5.

7. A phenol-formaldehyde resin, comprising: formaldehyde to phenol molar ratios of about 1.9–5:1, characterized by carbon-13 nuclear magnetic resonance spectra as
    benzyl formal groups, of the formula Ph—(CH$_2$O)$_n$CH$_2$OH wherein n≧1, which includes at least about 30 molar percent of the total formaldehyde content of resin;

methylene groups, of the formula

Ph—CH$_2$—Ph which includes less than about 20 molar percent of the formaldehyde content of the resin; and methylol groups, of the formula Ph—CH$_2$OH which includes less than about 40 molar percent of the formaldehyde content of the resin, wherein PH— is a phenol nucleus, said resin capable of curing at 130°–150° C. to an infusible, cross-linked solid.

8. A phenol-formaldehyde resin, comprising: a water-dilutable condensation product of formaldehyde and phenol in the molar ratios of 2.0–3.2:1, said resin curable to an insoluble cross-linked, infusible solid at 130°–150° C., wherein the formaldehyde content of the resin, prior to curing, characterized by carbon-13 nuclear magnetic resonance spectra, is bound to and distributed among phenol nuclei of the resin as formal groups of the form
Ph—(CH$_2$—O)$_n$—CH$_2$—OH   n≧1, in an amount of about 30–40 molar percent of the total formaldehyde content of the resin;

ether groups of the form

Ph—CH$_2$—O—CH$_2$—Ph in an amount of about 5–10 molar percent;

methylol groups of the form

Ph—CH$_2$OH in an amount of about 9–40 molar percent;

methylene groups of the form

Ph—CH$_2$—Ph in an amount of about 10–20 molar percent; and free formaldehyde in an amount of about 10–20 molar percent wherein Ph indicates a phenol nucleus and the percentages indicated are the percent of the indicated group with respect to the total moles of formaldehyde charged to the resin system.

9. A process for making a low-color, substantially water-dilutable phenol-formaldehyde resin intermediate that cures, without adding additional formaldehyde, to an insoluble, infusible solid at 130°–150° C., comprising:

mixing phenol, water and 0.5–2.2 moles per 100 moles of phenol of an alkali catalyst material, wherein the pH of the reaction mixtures is 7.0–10.9;

adding formaldehyde to the reaction mixture such that the ratio of formaldehyde to phenol is about 1.9–5.0:1;

heating said reaction mixture to reflux temperature, with stirring, at a uniform rate over about a 1-hour period;

refluxing said mixture until a viscosity of about 400–2600 centipoise at 50–75% resin solids content is attained;

cooling the reaction mixture; and adjusting the pH of the mixture with an acid to a pH of 3.0–6.0 wherein the resulting resin intermediate, characterized by carbon-13 nuclear magnetic resonance spectra, includes formaldehyde bound to and distributed among phenol nuclei of the resin as benzyl formal groups, of the formula Ph—(CH$_2$O)$_n$CH$_2$OH wherein n≧1, which includes at least about 30 molar percent of the total formaldehyde content of the resin;

methylene groups of the formula

Ph—CH$_2$—Ph which includes less than about 20 molar percent of the total formaldehyde content of the resin, and methylol groups, of the formula Ph—CH$_2$OH which includes less than about 40 molar percent of the formaldehyde content of the resin, wherein Ph— is a phenol nucleus.

10. The process of claim 9 wherein said alkali catalyst material is selected from the group consisting of hydroxides and carbonates of lithium, sodium, potassium, magnesium and calcium.

11. The process of claim 9 wherein the alkali catalyst is 0.5–1.5 moles of catalyst per 100 moles of phenol, resulting in a reaction mixture pH of 7.1–8.2.

12. The process of claim 11 wherein said catalyst is lithium carbonate.

13. The process of claim 9 wherein said adjusting acid step is to a pH range of about 4–5.

14. A process for making a low-color, substantially water-dilutable phenol-formaldehyde resin intermediate, suitable for making resin-glass cloth laminates, comprising:

mixing phenol, water and 0.5–1.5 moles lithium carbonate catalyst per 100 moles of phenol wherein the pH of the mixture is 7.2–6.2;

adding formaldehyde to the reaction mixture so that the ratio of formaldehyde to phenol is about 2.0–3.2:1;

heating said mixture to reflux temperature, at about 100°–115° C. at atmospheric pressure, with stirring, over a period of about 1 hour;

refluxing said mixture until a viscosity of about 400–500 centipoise, at 60–75% by weight resin solids content, is attained;

cooling said mixture; and neutralizing said mixture with citric acid to a final pH of 4.0–5.0 wherein said finished intermediate resin, characterized by carbon-13 nuclear magnetic resonance spectra, includes formaldehyde bound to and distributed among phenol nuclei of the resin as benzyl formal groups, of the formua Ph—(CH$_2$O)$_n$CH$_2$OH   n≧1 which includes at least about 30 molar percent of the total formaldehyde content of the resin, methylene groups of the formula Ph—CH$_2$—Ph which includes less than about 20 molar percent of the total formaldehyde content of the resin, and methylol groups, of the formula Ph—CH$_2$OH which includes less than about 40 molar percent of the total formaldehyde content of the resin, wherein Ph— is in phenol nucleus.

* * * * *